United States Patent
Han et al.

(10) Patent No.: US 7,081,733 B2
(45) Date of Patent: Jul. 25, 2006

(54) SPEED CONTROL SYSTEM OF FAN MOTOR OF AIR CONDITIONER

(75) Inventors: Seung-Do Han, Incheon (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/068,910

(22) Filed: Mar. 2, 2005

(65) Prior Publication Data

US 2006/0061321 A1 Mar. 23, 2006

(30) Foreign Application Priority Data

Sep. 23, 2004 (KR) .................... 10-2004-0076636

(51) Int. Cl.
*H02P 5/00* (2006.01)
(52) U.S. Cl. .................... 318/801; 318/700; 318/727; 318/34; 318/254
(58) Field of Classification Search ................ 318/801, 318/34, 254, 700, 727
See application file for complete search history.

(56) References Cited

U.S. PATENT DOCUMENTS

| | | | | |
|---|---|---|---|---|
| 3,922,574 A | * | 11/1975 | Whiteley ............... 310/156.32 |
| 4,064,420 A | * | 12/1977 | Yuda et al. .................. 318/776 |
| 4,371,802 A | * | 2/1983 | Morrill ....................... 310/166 |
| 4,823,067 A | * | 4/1989 | Weber ......................... 318/799 |
| 4,893,479 A | * | 1/1990 | Gillett et al. ................. 62/213 |
| 5,838,085 A | * | 11/1998 | Roesel et al. ............... 310/113 |
| 6,121,749 A | * | 9/2000 | Wills et al. ................. 318/811 |
| 6,232,742 B1 | * | 5/2001 | Wacknov et al. ........... 318/811 |
| 6,320,775 B1 | * | 11/2001 | Ito et al. ..................... 363/132 |
| 6,735,284 B1 | | 5/2004 | Cheong et al. ............. 318/801 |
| 6,819,026 B1 | * | 11/2004 | Narita et al. ................ 310/266 |
| 6,876,171 B1 | | 4/2005 | Lee ............................ 318/767 |
| 2002/0140309 A1 | * | 10/2002 | Yanashima et al. ......... 310/162 |
| 2004/0012350 A1 | * | 1/2004 | Weinmann .................. 318/110 |
| 2005/0231151 A1 | * | 10/2005 | Ilda ............................. 318/785 |

* cited by examiner

*Primary Examiner*—Rita Leykin
(74) *Attorney, Agent, or Firm*—Greenblum & Bernstein, P.L.C.

(57) ABSTRACT

A speed control system of a fan motor of an air conditioner is disclosed. A speed control system of a fan motor of an air conditioner comprises: an inverter having a power output terminal connected to a single-phase power input terminal of the fan motor which has a single-phase stator including a main coil and a sub coil, an induction rotor and a permanent magnet rotor installed between the stator and the induction rotor; and a three-phase driving motor connected to the power output terminal of the inverter and driving a compressor of an air conditioner by power received from the inverter.

16 Claims, 4 Drawing Sheets

| EMBODIMENT | 1 | | 2 | | 3 | |
|---|---|---|---|---|---|---|
| THE NUMBER OF POLES OF MOTOR | THREE-PHASE DRIVING MOTOR | FAN MOTOR | THREE-PHASE DRIVING MOTOR | FAN MOTOR | THREE-PHASE DRIVING MOTOR | FAN MOTOR |
| | 6 | 18 | 4 | 12 | 2 | 6 |
| FREQUENCY OF OUTPUT POWER OF INVERTER [Hz] | THE NUMBER OF ROTATION OF MOTOR [rpm] | | THE NUMBER OF ROTATION OF MOTOR [rpm] | | THE NUMBER OF ROTATION OF MOTOR [rpm] | |
| 210 | 4200 | 1400 | 6300 | 2100 | 12600 | 4200 |
| 180 | 3600 | 1200 | 5400 | 1800 | 10800 | 3600 |
| 90 | 1800 | 600 | 2700 | 900 | 5400 | 1800 |
| 60 | 1200 | 400 | 1800 | 600 | 3600 | 1200 |
| 45 | 900 | 300 | 1350 | 4500 | 2700 | 900 |
| 30 | 600 | 200 | 900 | 300 | 1800 | 600 |

SPEED CONTROL SYSTEM OF FAN MOTOR OF AIR CONDITIONER

BACKGROUND OF THE INVENTION

1. Field of the Invention

The present invention relates to a fan motor of an air conditioner, and particularly, to a speed control system of a fan motor of an air conditioner.

2. Description of the Background Art

In general, a single-phase induction motor is used as a fan motor of an air conditioner. To generate a rotating torque, the signal-phase induction motor supplies both a magnetizing current generating a rotating magnetic field and an induced current generated in a rotor to windings connected to an external power terminal.

The single-phase induction motor has limit in improving efficiency by a primary copper loss and a secondary copper loss of a rotor. To solve such limit, an HIM (Hybrid Induction Motor) shown in FIGS. 1 and 2 is being used recently as a fan motor of the air conditioner. Hereinafter, an induction motor having a permanent magnet rotor is defined as an HIM.

FIG. 1 is a schematic sectional view of the HIM in accordance with the conventional art.

FIG. 2 is a schematic top view taken along line B–B' of the HIM of FIG. 1.

As shown in FIGS. 1 and 2, a stator 102 is installed inside a bracket 101 of the HIM in accordance with the conventional art, and an induction rotor 103 is installed inside the stator 102. A plurality of slots 105 are protrudingly formed inside the stator 102, and coils 106 are respectively wound on the slots 105.

Aluminum rotor bars 107 are vertically inserted in a plurality of air gaps 103A formed at an edge of the rotor 103 in a vertical direction, and the aluminum rotor bars 107 are connected to each other by an end ring 108.

A rotating shaft 109 for transferring a rotary force of the rotor 103 to the outside is installed at an air gap 103B formed at the center of the induction rotor 103. The rotating shaft 109 becomes rotatable by an oilless bearing 110 installed at the bracket 101.

A permanent magnet rotor 104 for rotating the rotor 103 at a strong magnetic flux while being rotated by a rotating magnetic field generated from the stator 102 is installed between the stator 102 and the induction rotor 103.

When an AC voltage is applied to the HIM in accordance with the conventional art, the permanent magnet rotor 104 is rotated by a current applied to the coil 106 of the stator 102, and the rotated permanent magnet rotor 104 generates a rotating magnetic field having a strong magnetic flux, thereby rotating the induction rotor 103. At this time, the low inertial permanent magnetic rotor 104 separated from a fan (not shown) is rotated by the rotating magnetic field of the stator 102, and a torque generating magnetic flux is supplied to the induction rotor 103 by the rotating magnetic field of the permanent magnet rotor 104, so that the induction rotor 103 is rotated. Namely, when the permanent magnet rotor 104 rotated by an oval-shaped rotating field generated from the stator of distributing windings is rotated, the permanent magnet rotor 104 generates a rotating magnetic field having a strong magnetic flux, thereby rotating the induction rotor 103. Therefore, the HIM is operated at high efficiency, making a low noise.

Speed characteristics of the HIM and a general induction motor in accordance with the conventional art will now be described with reference to FIG. 3.

FIG. 3 is a graph showing a speed characteristic of the HIM and the general induction motor according to the conventional art.

As shown, when a speed control system of controlling a rotating speed of a fan motor by controlling a voltage applied to the fan motor (HIM) is applied to the HIM, a speed control range is restricted according to the voltage (e.g., 790~880 rpm (revolution per minute)). Namely, because of the permanent magnet rotor 104, the speed control range is restricted within 790~880 rpm. For this reason, the speed control system in accordance with the conventional art cannot be applied to the air conditioner requiring a speed control range of 100 rpm or more.

Meanwhile, an induction motor used as a fan motor of an air conditioner in accordance with the conventional art is disclosed in U.S. Pat. No. 6,819,026 registered on Nov. 16th in 2004.

SUMMARY OF THE INVENTION

Therefore, an object of the present invention is to provide a speed control system of a fan motor of an air conditioner capable of extending a speed control range of a fan motor by controlling a fan motor using output power of an inverter for driving a driving motor of a compressor.

Another object of the present invention is to provide a speed control system of a fan motor of an air conditioner capable of extending a speed control range of a fan motor without any special additional cost by controlling a fan motor using a frequency of output power of an inverter for driving a driving motor of a compressor without a special device.

To achieve these and other advantages and in accordance with the purpose of the present invention, as embodied and broadly described herein, there is provided a speed control system of a fan motor of an air conditioner comprising: an inverter having a power output terminal connected to a single-phase power input terminal of the fan motor which has a single-phase stator including a main coil and a sub coil, an induction rotor and a permanent magnet rotor installed between the stator and the induction rotor; and a three-phase driving motor connected to the power output terminal of the inverter and driving a compressor of an air conditioner by power received from the inverter.

To achieve these and other advantages and in accordance with the purpose of the present invention, as embodied and broadly described herein, there is provided a speed control system of a fan motor of an air conditioner comprising: an inverter having a power output terminal connected to a three-phase power input terminal of a fan motor which has a three-phase stator including a three-phase balancing coil, a induction rotor and a permanent magnet rotor installed between the stator and the induction rotor; and a three-phase driving motor connected to the power output terminal of the inverter and driving a compressor of an air conditioner by power received from the inverter.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, preferred embodiments of a speed control system of a fan motor of an air conditioner in accordance with the present invention capable of extending a speed control range of a fan motor by controlling a fan motor using output power of an inverter for driving a driving motor of a compressor, and of extending a speed control range of a fan motor without any special additional cost by controlling a fan motor using a frequency of output power of the inverter for driving a driving motor of a compressor without a special device, will now be described with reference to FIGS. 4 to 6.

Figure 1:
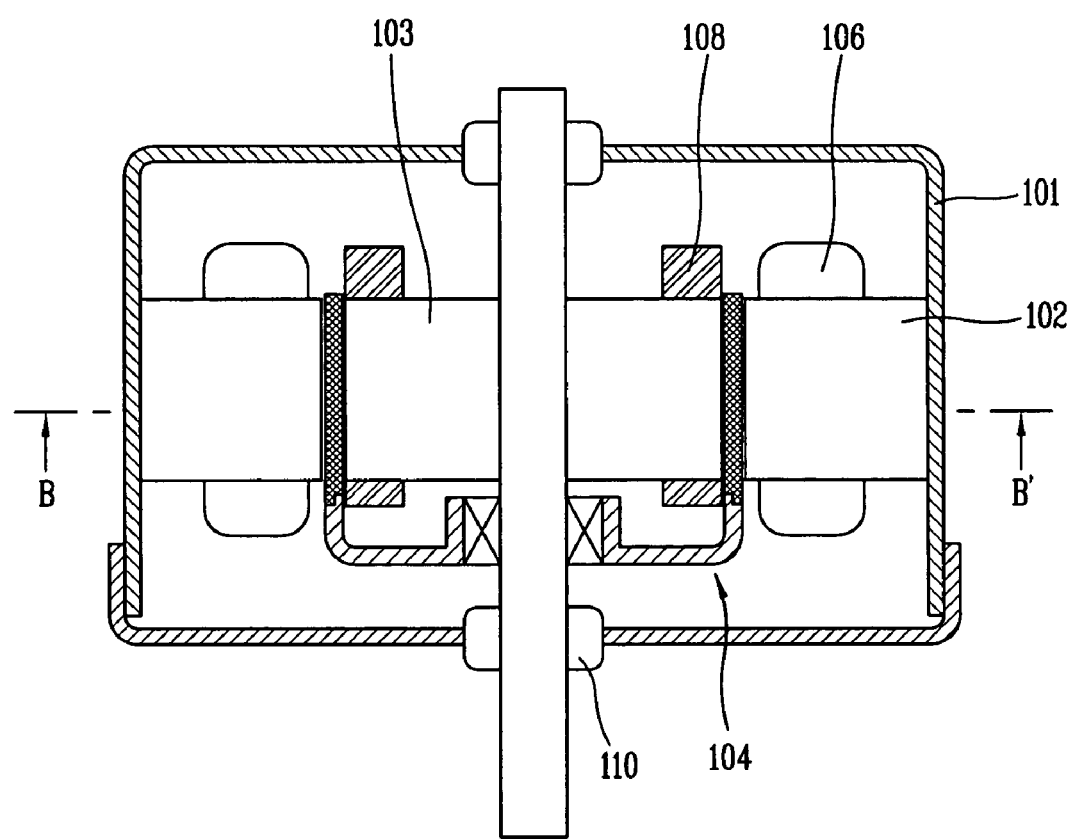
FIG. 1 is a schematic sectional view of an HIM in accordance with the conventional art.
Figure 2:
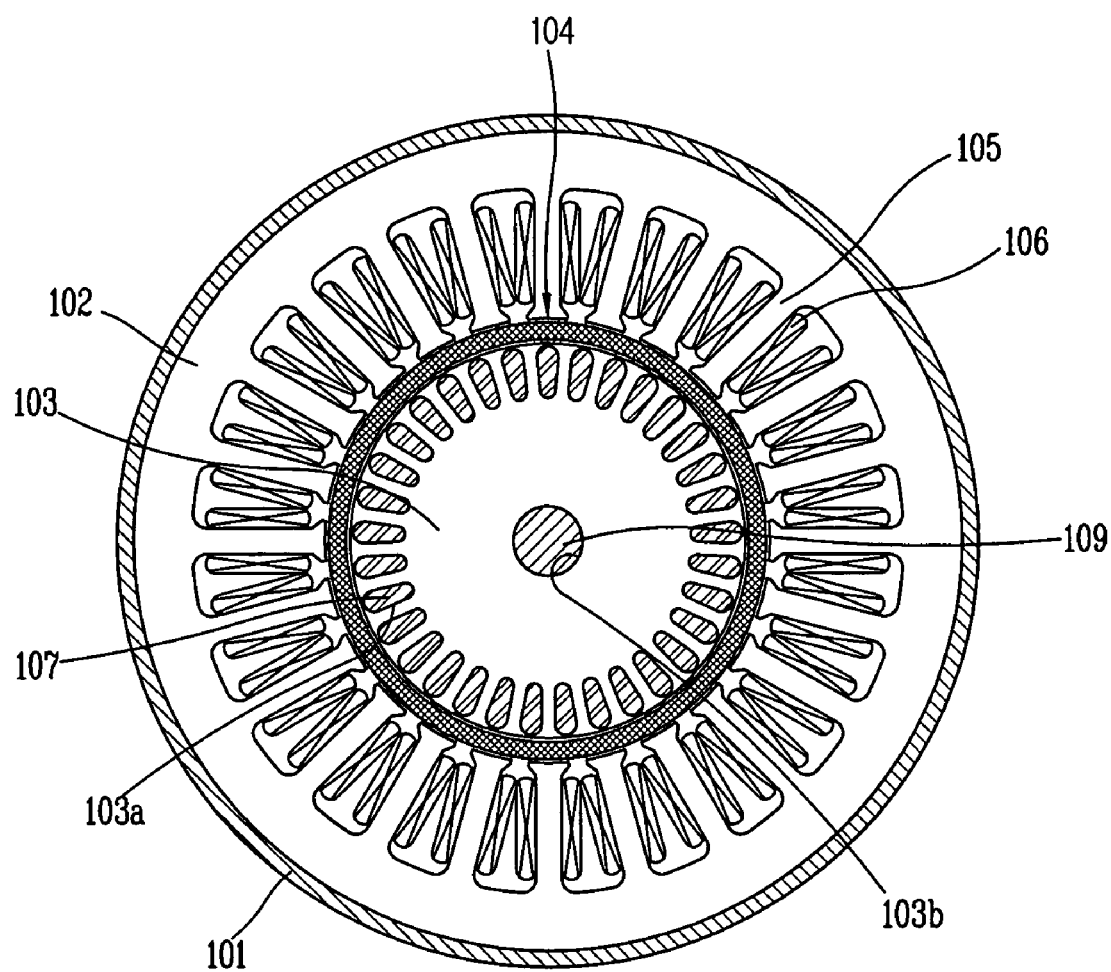
FIG. 2 is a schematic top view taken along line B–B' of the HIM of FIG. 1.
Figure 3:
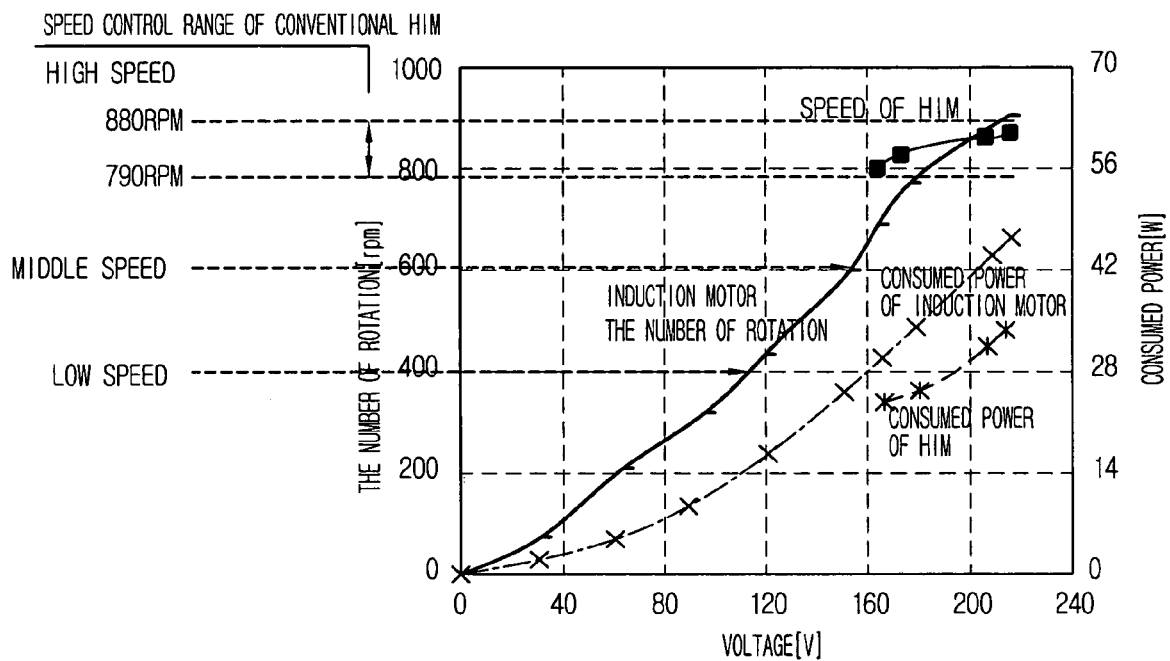
FIG. 3 is a graph showing a speed characteristic of the HIM and a general induction motor in accordance with the conventional art.
Figure 4:
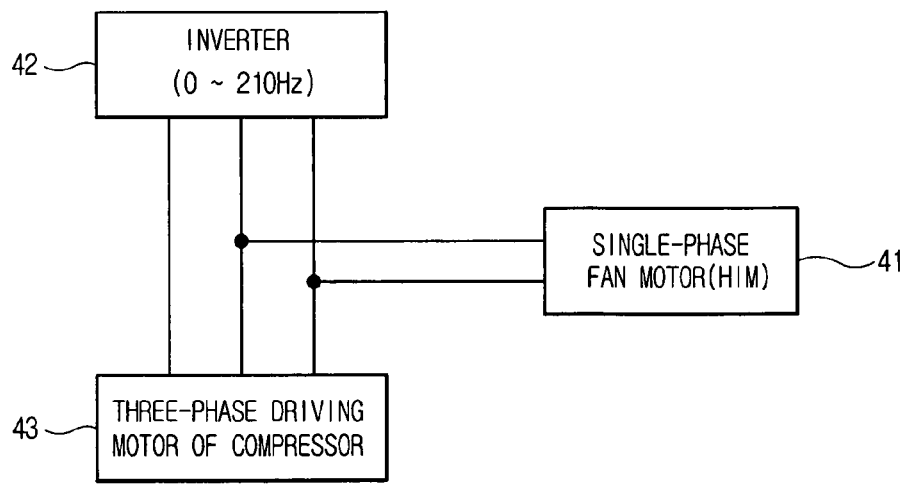
FIG. 4 is a circuit view showing a structure of a speed control system of a fan motor of the air conditioner in accordance with an embodiment of the present invention.

FIG. 4 is a circuit view showing a structure of a speed control system of a fan motor of an air conditioner in accordance with one embodiment of the present invention.

As shown, the speed control system of the fan motor of the air conditioner in accordance with the present invention includes: an inverter 42 having a power output terminal connected to a single-phase power input terminal of the fan motor 41 which has a single-phase stator 102 including a main coil and a sub coil, an induction rotor 103 and a permanent magnet rotor 104 installed between the stator and the induction rotor; and a three-phase driving motor 43 connected to the power output terminal of the inverter 42 and driving the compressor of the air conditioner by power received from the inverter 42. Here, the three-phase driving motor 43 is a three-phase brushless direct current (BLDC) motor, a three-phase induction motor or a three-phase HIM (Hybrid Induction Motor).

A control means (not shown) outputs a control signal for varying a compression capacity of the compressor to the inverter 42 according to an indoor temperature and a desired temperature of a user.

The inverter 42 varies a frequency of driving power of the three-phase driving motor 43 as a switching device of the inverter 42 is switched according to the outputted control signal. The rotating speed of the three-phase driving motor 43 is varied according to the varied frequency of the driving power. At this time, the fan motor 41 receives the varied frequency of the driving power from the inverter 42, thereby interworking with the three-phase driving motor 43 of the compressor and thus rotating.

However, in general, the three-phase driving motor 43 rotates at a specific rpm (e.g., 2400 rpm) by the frequency of the driving power outputted from the inverter 42, and the fan motor 41 should rotate at an rpm (e.g., 800 rpm) of about ⅓ of the specific rpm. For example, the three-phase driving motor 43 rotates at 1200 rpm~3600 rpm by 60 Hz, a frequency of the driving power outputted from the inverter 42, and, the fan motor 41 should rotate at 400 rpm~1200 rpm. Accordingly, a process for allowing a ratio of the number of rotation of the three-phase driving motor 43 to the number of rotation of the fan motor 41 to be 3:1 by the frequency of the driving power is required. To this end, the present invention is designed so that the number of poles of the fan motor 41 is three times greater than the number of poles of the three-phase driving motor 43 of the compressor.

And, because the fan motor 41 is a single-phase HIM having a stator including a main coil and a sub coil, the fan motor 41 receives single-phase power from a three-phase power output terminal of the three-phase inverter 42.

Another embodiment of a speed control system of a fan motor of an air conditioner in accordance with the present invention will now be described with reference to FIG. 5.

Figures 5, 6:
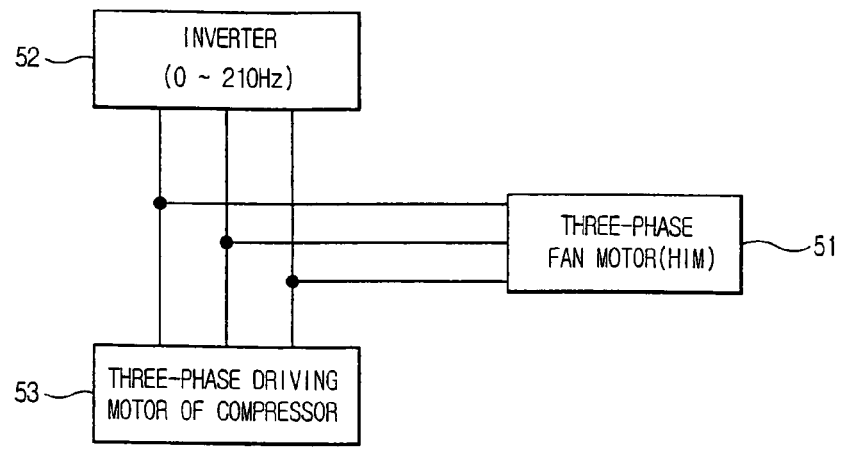
FIG. 5 is a circuit view showing a structure of a speed control system of a fan motor of an air conditioner in accordance with another embodiment of the present invention.
FIG. 6 is a table showing a correlation between a speed of a fan motor of the air conditioner and a power frequency according to the number of poles of a three-phase driving motor and the number of poles of a fan motor in accordance with the present invention.

FIG. 5 is a circuit view showing a structure of a speed control system of the fan motor of the air conditioner in accordance with another embodiment of the present invention.

As shown, the speed control system of the fan motor of the air conditioner in accordance with another embodiment of the present invention includes: an inverter 52 having a power output terminal connected to a three-phase power input terminal of a fan motor 51 which has a three-phase stator including a three-phase balancing coil, an induction rotor and a permanent magnet rotor installed between the stator and the induction rotor; and a three-phase driving motor 53 connected to a power output terminal of the inverter 52 and driving a compressor of the air conditioner by power received from the inverter 52. Here, the three-phase driving motor 53 is a three-phase BLDC (Brushless Direct Current) motor, a three-phase induction motor or a three-phase HIM (Hybrid Induction Motor).

In the speed control system of the fan motor of the air conditioner in accordance with another embodiment of the present invention having such a structure, preferably, a three-phase HIM having a three-phase stator including a three-phase balancing coil is used as the fan motor 51 instead of a single-phase HIM having a stator including a main coil and a sub coil. Accordingly, the speed control system of the fan motor of the air conditioner in accordance with another embodiment of the present invention has no difference from the speed control system of the fan motor of the air conditioner in accordance with one embodiment of the present invention except that the fan motor 51 is connected to a three-phase power output terminal of the three-phase inverter 52 and receives the driving power.

A specific example according to the present invention will now be described with reference to FIG. 6.

FIG. 6 is a table showing a correlation between a speed of a fan motor of an air conditioner and a power frequency according to the number of poles of a three-phase driving motor and the number of poles of the fan motor in accordance with the present invention.

Referring to embodiment 1 of FIG. 6, the number of poles of the three-phase driving motor and the number of poles of the fan motor are six and eighteen, respectively, and therefore have a correlation ratio of 1:3. The three-phase driving motor rotates at 4200~600 rpm according to the output power frequency (210~30 Hz) of the inverter, and the fan motor can rotate at 1400~200 rpm.

Referring to embodiment 2 of FIG. 6, the number of poles of the three-phase driving motor and the number of poles of the fan motor are four and twelve, respectively, and thus have a correlation ratio of 1:3. The three-phase driving motor rotates at 6300~900 rpm according to the output power frequency (210~30 Hz) of the inverter and the fan motor can rotate at 2100~300 rpm.

Referring to embodiment 3 of FIG. 6, the number of poles of the three-phase driving motor and the number of poles of the fan motor are two and six, respectively, and thus have a correlation ratio of 1:3. The three-phase driving motor rotates at 12600~1800 rpm according to the output power frequency (210~30 Hz) of the inverter and the fan motor can rotate at 4200~600 rpm.

As described in embodiments 1 to 3 of FIG. 6, the present invention can remarkably extend the speed control range of the fan motor of the air conditioner compared to the conventional art.

As so far described, the speed control system of the fan motor of the air conditioner according to the present invention can extend a speed control range of a fan motor by controlling the fan motor using output power of the inverter that drives a driving motor of a compressor.

Also, the speed control system of the fan motor of the air conditioner according to the present invention can extend a speed control range of the fan motor without any special additional cost by controlling the fan motor using a frequency of the output power of the inverter that drives a driving motor of a compressor without a special device.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A speed control system of a fan motor of an air conditioner comprising:
   an inverter having a power output terminal connected to a single-phase power input terminal of the fan motor which has a single-phase stator including a main coil and a sub coil, an induction rotor and a permanent magnet rotor provided between the stator and the induction rotor, the inverter configured to control a speed of the fan motor; and
   a three-phase driving motor connected to the power output terminal of the inverter and driving a compressor of an air conditioner by power received from the inverter,
   wherein both the three-phase driving motor of the compressor and the single-phase fan motor are directly connected to the inverter.

2. The system of claim 1, wherein the fan motor receives single-phase power from the power output terminal of the inverter that supplies three-phase power to the three-phase driving motor.

3. The system of claim 1, wherein the number of poles of the fan motor is three times greater than the number of poles of the three-phase driving motor that drives the compressor.

4. The system of claim 1, wherein the number of poles of the three-phase driving motor of the compressor and the number of poles of the fan motor are six and eighteen, four and twelve, or two and six, respectively.

5. The system of claim 1, wherein the three-phase driving motor is a three-phase brushless direct current (BLDC) motor.

6. The system of claim 1, wherein the three-phase driving motor is a three-phase induction motor.

7. The system of claim 1, wherein the three-phase driving motor is a three-phase hybrid induction motor (HIM).

8. The system of claim 1, further comprising:
   a controller that outputs a control signal to control the inverter in order to vary a compression capacity of the compressor according to an indoor temperature and a desired temperature of a user.

9. A speed control system of a fan motor of an air conditioner comprising:
   an inverter having a power output terminal connected to a three-phase power input terminal of a fan motor which has a three-phase stator including a three-phase balancing coil, an induction rotor and a permanent magnet rotor provided between the stator and the induction rotor, the inverter configured to control a speed of the fan motor; and
   a three-phase driving motor connected to the power output terminal of the inverter and driving a compressor of an air conditioner by power received from the inverter,
   wherein both the three-phase driving motor of the compressor and the single-phase fan motor are directly connected to the inverter.

10. The system of claim 9, wherein the fan motor receives three-phase power from the power output terminal of the inverter that supplies three-phase power to the three-phase driving motor.

11. The system of claim 9, wherein the number of poles of the fan motor is three times greater than the number of poles of the three-phase driving motor that drives the compressor.

12. The system of claim 9, wherein the number of poles of the three-phase driving motor of the compressor and the number of poles of the fan motor are six and eighteen, four and twelve, or two and six, respectively.

13. The system of claim 9, wherein the three-phase driving motor is a three-phase BLDC motor.

14. The system of claim 9, wherein the three-phase driving motor is a three-phase induction motor.

15. The system of claim 9, wherein the three-phase driving motor is a three-phase HIM(hybrid induction motor).

16. The system of claim 9, further comprising:
   a controller that outputs a control signal to control the inverter in order to vary a compression capacity of the compressor according to an indoor temperature and a desired temperature of a user.

* * * * *